Jan. 6, 1959   A. HEURTIER   2,867,439
SOUND READING DEVICE FOR KINEMATOGRAPHIC PROJECTORS
Filed Oct. 29, 1954   5 Sheets-Sheet 2
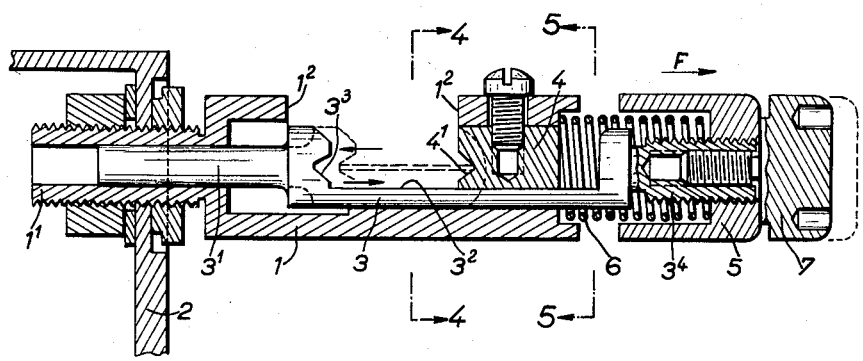
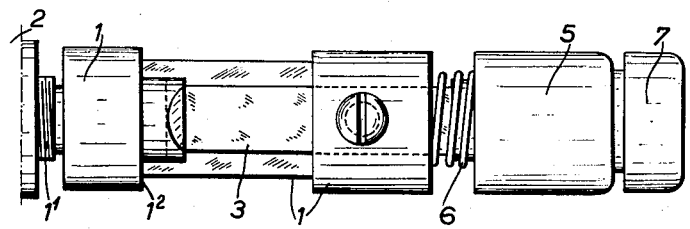
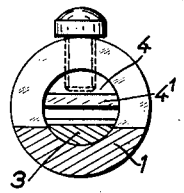   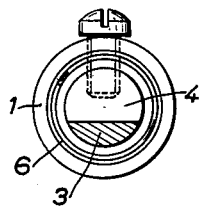
INVENTOR
Antoine HEURTIER
BY J. Delater-Ayny
ATTORNEY Jan. 6, 1959    A. HEURTIER    2,867,439
SOUND READING DEVICE FOR KINEMATOGRAPHIC PROJECTORS
Filed Oct. 29, 1954    5 Sheets-Sheet 3
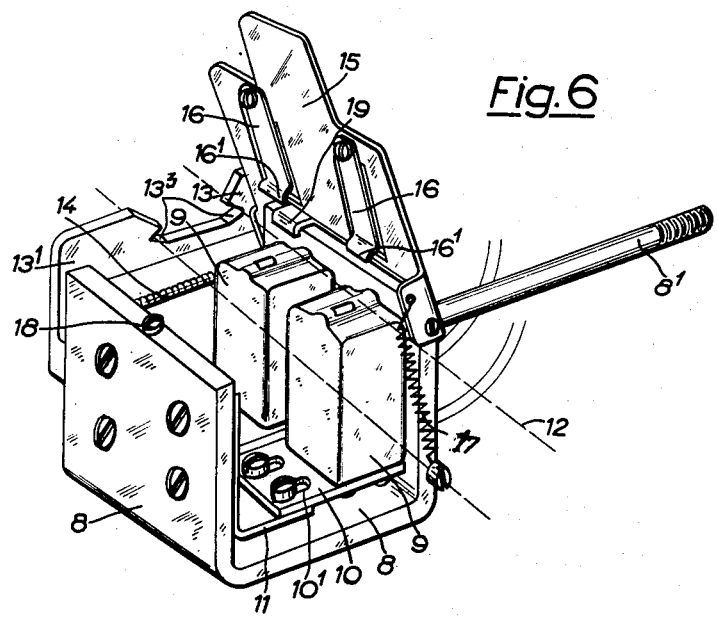
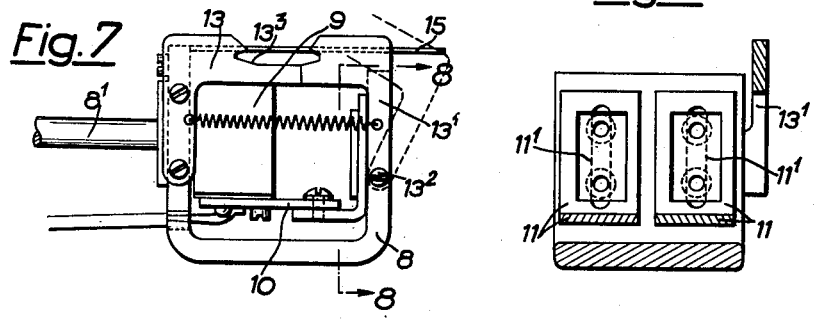
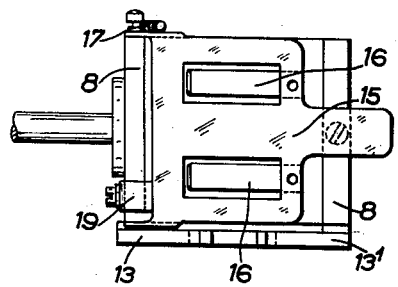
INVENTOR
Antoine HEURTIER
BY
ATTORNEY Jan. 6, 1959 A. HEURTIER 2,867,439
SOUND READING DEVICE FOR KINEMATOGRAPHIC PROJECTORS
Filed Oct. 29, 1954 5 Sheets-Sheet 4
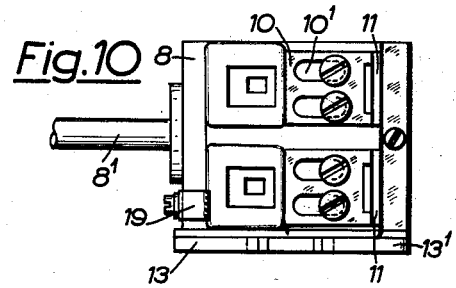
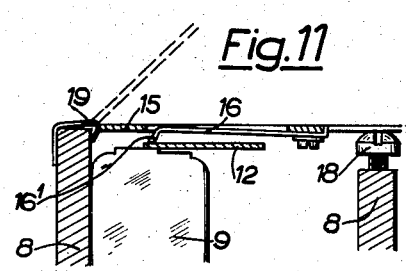
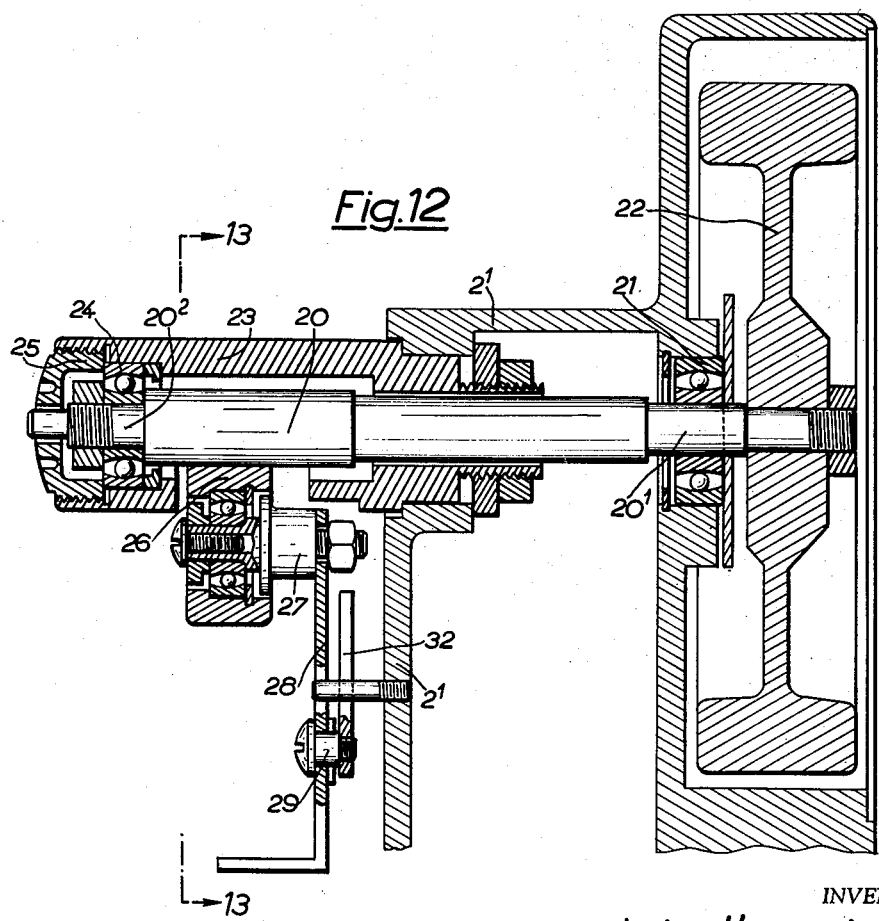
INVENTOR
Antoine HEURTIER
BY J. Delattre-Seguy
ATTORNEY Jan. 6, 1959  A. HEURTIER  2,867,439
SOUND READING DEVICE FOR KINEMATOGRAPHIC PROJECTORS
Filed Oct. 29, 1954  5 Sheets-Sheet 5

INVENTOR
Antoine HEURTIER
BY J. Delatre-Seguy
ATTORNEY

United States Patent Office 2,867,439
Patented Jan. 6, 1959

2,867,439
SOUND READING DEVICE FOR KINEMATO-
GRAPHIC PROJECTORS

Antoine Heurtier, Saint-Etienne, France, assignor to Etablissements Heurtier & Cie, Saint-Etienne, France, a French corporation Application October 29, 1954, Serial No. 465,699

Claims priority, application France March 25, 1954

7 Claims. (Cl. 274—4)

The reading of the magnetic tracks of kinematographic films during projection with a view to producing sound implies severe conditions as concerns the accurate guiding of the film, its accurate unwinding in register with the magnetic reading head and also the pressure which should be applied to the film so as to allow its movement in both directions without any possible wobbling of the film.

Now, according to my invention and in order to provide the best conditions for reading such a sound track, the film is guided and positioned ahead of the magnetic reading heads so as to be adjusted in various directions and to provide thus perfect coincidence between the magnetic sound track and the reading heads, while further means are provided for guiding the film in the immediate proximity of the reading heads and for urging the film with a suitable adjustable pressure against said reading heads and the film further engages beyond the reading heads a perfectly defined position on the surface of a freely revoluble shaft between two bearing sections of said shaft.

In accompanying drawings illustrating a preferred embodiment of the invention, without however limiting the scope of the latter otherwise than as provided in accompanying claims.

Fig. 2 is an axial cross-section of the film guide ahead of the system of the magnetic reading heads.

Fig. 3 is a plan view corresponding to Fig. 2.

Figs. 4 and 5 are transverse cross-sections respectively through lines 4—4 and 5—5 of Fig. 2.

Fig. 6 is a perspective view of the system of magnetic reading heads.

Fig. 7 is a side view of such a system, the interrupted lines showing the shifted position of a pivoting film-guiding member.

Fig. 8 is a cross-section through line 8—8 of Fig. 7.

Figs. 9 and 10 are plan views shown respectively with the film-presser plate folded down in its operative position and with said plate removed.

Fig. 11 is, on a larger scale, a partly elevational, partly sectional view disclosing the operation of the film-presser plate with reference to the film and to the magnetic reading heads. The interrupted lines show an angular inoperative position of said film-presser plate.

Fig. 12 is an axial cross-section of the arrangement adapted to hold down and to clamp the film after it has passed through the system of magnetic heads.

Figure 1:
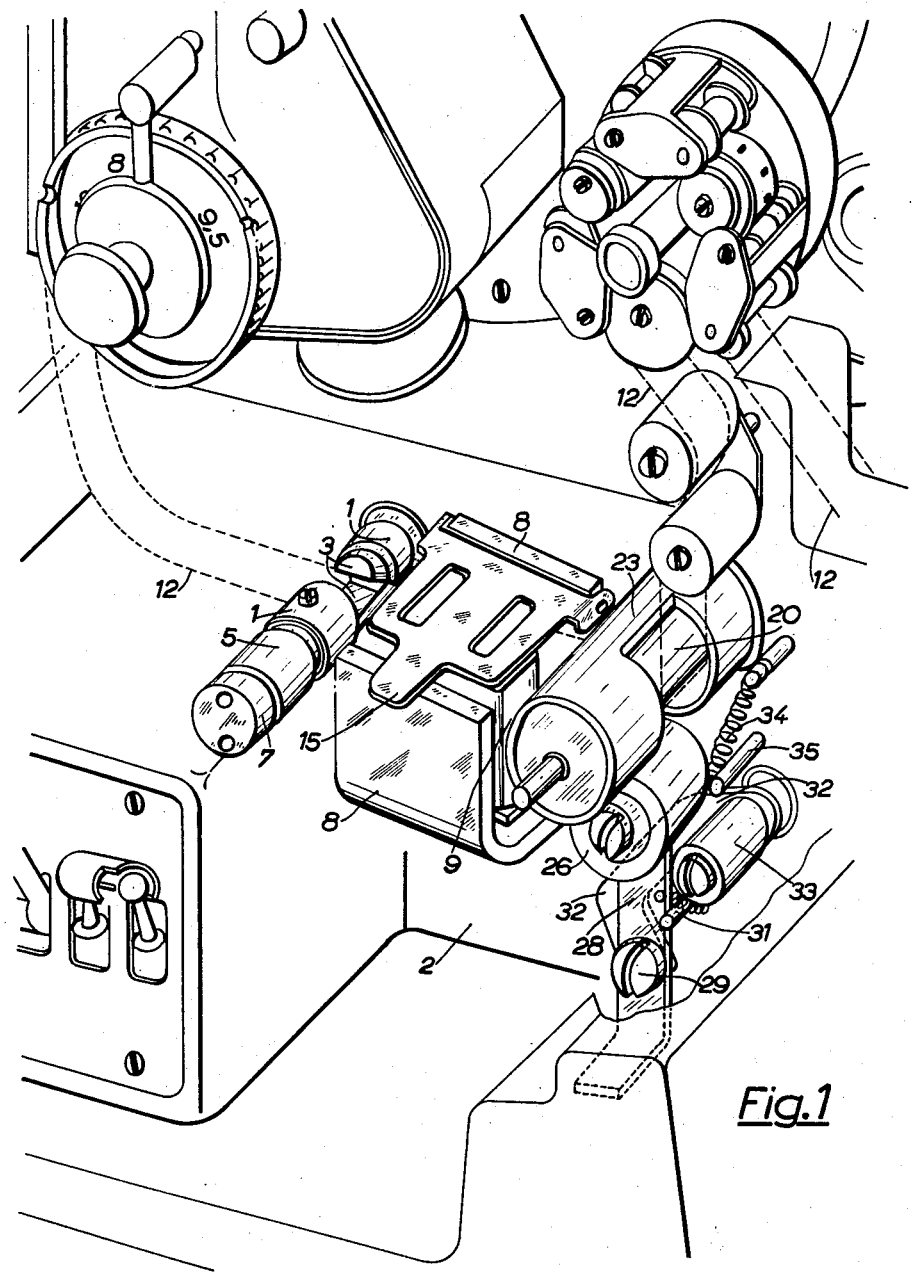
Fig. 1 is a general perspective view showing the improved sound reader, according to the invention, illustrated as mounted on a kinematographic projector, part of which is shown by way of a mere exemplification.
Figure 13:
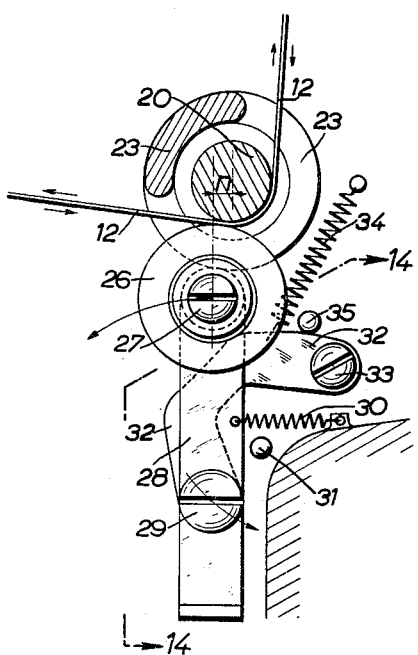

Fig. 13 is a front view, partly sectional, through line 13—13 of Fig. 12.

Figure 14:
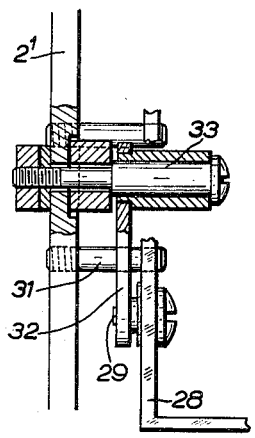

Fig. 14 is a side view, partly sectional, through the broken line 14—14 of Fig. 13.

My improved sound-reading means includes a film guide located ahead of the sound-reading means and constituted by a carrier 1 having a cylindrical shape as illustrated in Figs. 2 to 5. Said carrier is secured to the frame 2 of the projector by means of a threaded connection $1^1$ associated with a nut and a counter-nut providing for an axial adjustment of the location of said carrier 1 with reference to said frame 2.

The carrier 1 is provided on a section of its length with a transverse recess $1^2$ in register with which the carrier body is constituted by a short segment of a cylinder as shown cross-sectionally in Fig. 4. This recess $1^2$ allows the passage of the film across the inside of the carrier 1 the axial bore of which is slidingly engaged by a cylindrical member 3 which is provided with an extension or tail-piece $3^1$ slidingly engaging an axial opening in the extension $1^1$ of the carrier.

The cylindrical member 3 is also recessed transversely at $3^2$ so that the body of said member 3 is reduced in register with said recess to a sector of a solid cylinder substantially flush with the corresponding surface of the recessed part of the carrier 1 (Fig.4).

In one transverse end of the recess 3, there opens a diametrical slot $3^3$ having cross-sectionally the shape of an inverted V and adapted to hold and guide the film while the latter progresses.

A notch $4^1$ arranged symmetrically and of a similar shape is formed in a further substantially cylindrical member 4 slidingly fitted in the recessed part of the cylindrical member 3. The member 4 is secured by screwing for instance inside the bore of the cylindrical carrier 1 and it defines thus the angular location of the sliding member 3.

A threaded extension $3^4$ is formed in the cylindrical member 3 in axial alignment therewith and over said extension $3^4$ is screwed a cap 5 inside which is housed a spring 6 which is thus held between said cap and a cup-shaped member formed in the cooperating terminal surface of the carrier 1.

Operation of the cap 5 allows increasing or reducing the tensioning of the spring 6 and consequently the thrust exerted by said spring on the sliding member 3 with a view to centering and holding the film in the desired position between the notches $3^3$ and $4^1$ without braking the movement of the film.

A screw 7 screwed inside an axial tapping of the extension $3^4$ allows locking the cap 5 in the desired adjusted position.

The interrupted lines in Fig. 2 show different positions of the sliding member and also the position of the film held between the two cooperating notches $3^3$ and $4^1$.

The film-guide thus described shows the advantage of being adapted for use, after adjustment, for different film sizes.

The film passing out of the film-guide enters the system of magnetic reading heads (Figs. 6 to 11) which is constituted by a carrier casing 8, in U shape for instance, as illustrated by way of exemplification. Said casing 8 is secured to the frame 2 of the projector by a threaded rod 8 with which it is rigid. However, the securing means are shown only by way of example and may be modified as desired.

Magnetic reading heads 9 are secured each inside the casing 8 on a plate 10; said plates 10 are secured adjustably by screws as allowed by transverse screw-guiding slots $10^1$ whereby the said plates may slide over further square-shaped plates 11 and be clamped thereon by the screws; said square-shaped plates 11 are in their turn secured by screws to the casing 8 with the possibility of adjustment, as provided by vertical slots $11^1$ formed in the square-shaped plates 11 (Fig. 8) through which slots the securing screws pass and engage advantageously intermediate clamping plates.

There is therefore a double possibility of adjustment both transversely and vertically for the reading heads 9 inside the casing 8. It is thus possible to define exactly the location of said reading heads with reference to the magnetic track carried along the edge of the film 12 (Fig. 11).

Guiding means are provided so as to always engage the film accurately in an unvarying position on the reading heads and, to this end, there is provided a support made of two parts: a section 13 secured to the casing 8 and a section 13¹ pivotally secured to said casing at 13² (Fig. 7). A spring 14 is mounted with a predetermined stressing between these two parts of the support so as to urge them towards each other. V-shaped notches 13³ are formed in each of the sections 13 and 13¹ of the support. The film 12 is held and guided between said notches; it is possible to engage it easily through a mere shifting of the part 13¹ outwardly as shown in interrupted lines in Fig. 7. Lastly, it is important to hold the magnetic track of the film 12 in contact with the reading heads and this contact should be sufficiently energetic without by any means however braking the movement. To this end, a film pressing-plate 15 is pivotally secured to the upper edge of the casing 8. Spring blades 16 are secured to said film-pressing plate and their ends are incurved and rounded at 16¹ so as to engage the film 12.

As shown in the drawings, especially in Figs. 6, 9 and 11, the spring blades 16 are mounted on film-pressing plate 15 perpendicularly to the direction of travel of film 12, and the contact between ends 16¹ and film 12 is in a direction parallel to that of the travel of film 12, which is held flat against the heads.

To prevent any interference with the operation of the spring blades 16, openings registering with said blades are formed in the plate 15. A spring 17 exerts an elastic action on the plate 15 with a view to folding it back into engagement with the casing 8.

Said spring 17 is attached in the example illustrated on one hand to a lateral inturned lug of the plate 15 and on the other hand to a stationary point of the casing 8. A screw 18 screwed on the upper edge of the casing serves as a stop holding the plate 15 in its operative position and allows thus adjusting the pressure of the spring blades 16 on the film and on the reading heads.

In order to allow an easy insertion or removal of the film, the film-pressing plate 15 may be held in an angularly raised position as shown in interrupted lines in Fig. 11. To this end, a small spring blade 19 is secured to the upper edge of the casing 8 on the side pivotally connected with the plate 15, said spring 19 being bent and engaging the upper edge of the casing so as to allow a pivotal movement of the plate 15 against friction only under the action of a sufficient thrust, said plate being adapted to assume then a sloping position as illustrated in Fig. 11.

The film, after it has passed through the casing containing the magnetic reading heads should be driven without any possibility of wobbling and returning rearwardly, which would disturb the reading of the sound. During its progression towards the take up reel, the film engages the roller 20 (Figs. 12, 13 and 14) constituted by a shoulder on a shaft of which a terminal bearing section 20′ is fitted through the agency of a ball bearing 21 inside a bore provided in the frame 2 of the projector. The actual end of the shaft carries beyond said bearing section a flywheel 22 which is keyed and locked to said shaft inside the frame. The frame 2 includes a forward section 2¹ provided with a bore inside which is fitted the bearing section 23 of a carrier member secured in the frame coaxially with the roller 20 on the shaft, as illustrated in Fig. 12. A further bearing section 20² at the free end of the shaft is revolubly carried inside the bored carrier member 23 through the agency of a ball bearing 24. A plug 25 closes the end of the carrier member 23.

The ball or roller bearings at 21 and 24 are not essential and may be replaced by other suitable bearing means. The particularly rational mounting of the roller 20 on a shaft carried by spaced bearings, allows a perfectly accurate and permanent bearing for the film.

Over a part of its length, the carrier member 23 is recessed so as to form in register with its recessed part a mere bridge of a reduced cross-sectional area equal to about one quarter of the complete cross-section of the member, as shown in Fig. 13. This recessing allows the film to pass through the carrier member into engagement with the roller 20 and it also allows the passage and engagement of a pressure roller 26 urging the film into contact with the roller 20. Said roller 26 is revolubly carried by a spindle 27 through the agency of a ball bearing for instance. The spindle for the roller 26 is carried by a lever 28 pivotally secured to a spindle 29 carried by a second lever 32.

The lever 28 is submitted to the action of a tensioned spring 30 engaging on one hand the frame of the projector and on the other hand said lever 28 at a point above its frictional point of attachment to the spindle 29.

A stop 31 limits when required the pivotal movement of the lever 28 under the action of the spring 30. However, this pivotal movement is normally limited by the engagement of the roller 26 on the film carried by the roller 20. To this end, the axes of the rollers 26 and 20 when engaged are shifted on one hand by a distance $n$ in a direction perpendicular to the axis of the lever 28, and on the other hand, the distance between said axes is slightly less than the sum of the radii as clearly apparent from inspection of Fig. 13. The second lever 32 is pivotally secured at 33 to the frame of the projector as illustrated in Fig. 14. By reason of this arrangement, the lever 32 is preferably bent without this arrangement being essential.

A spring 34 connects a stationary point of the frame with the lever 32 and a stop 35 limits the pivotal movement of the lever 32 under the action of said spring 34. The result of this arrangement is that the roller 26 engages yieldingly the film 12 which is thus tensioned. The yielding thrust exerted is due to the mounting of the levers 28 and 32 and associated springs.

On the other hand, this mounting does not prevent the reverse movement of the film 12. The levers will then pivot in the direction of the arrows illustrated in Fig. 13 against the action of their springs.

The interest and advantages of the sound reading arrangement described are apparent from the above disclosure. Obviously and as already apparent from the preceding disclosure, my invention is by no means limited to the embodiments and applications which have been more particularly described and it furthers all the modifications falling within the scope of accompanying claims.

What I claim is:

1. In a magnetic sound-reading device for films in kinematographic projectors, said film having a sound track along its edge, in combination: a casing, magnetic reading heads in said casing, a lid on said casing over said heads, a carrier ahead of said casing and said heads and movable relatively to said casing, a recessed film passageway in said carrier, first guide means in said passageway and having cooperating V-notched surfaces, said first guide means being adjustable in length in a direction transverse to that of the travel of said films whereby said first guide means is adapted to accommodate films of different widths, second guide means intermediate said first guide means and said heads and adapted to guide the film as it is about to engage the heads said second guide means having cooperative V-notched surfaces, said first and second guide means guiding the film solely by engagement of the V-notches in said surfaces with the thickness of the longitudinal edges of the film, said carrier and said first and second guide means being adapted to guide and position said films to make the sound track register exactly in alignment with said heads, unitary spring means attached to said lid and adapted to contact directly the film in a direction parallel to that of the travel of said film and urging the film with an adjustable pressure over and flat against said heads, a freely revoluble shaft located beyond said heads, bearings for both ends of said shaft, and means adapted to urge the film passing off the heads into engagement with an accurately defined section of the shaft between its bearings, said shaft and said last named means cooperating to tension the film in its progression out of said casing to prevent wobbling of the film, thereby avoiding disturbance of the sound-reading.

2. A device as claimed in claim 1, in which said last named means comprise a roller and levers and springs elastically urging said roller against said shaft on the part thereof facing the heads and over the film, whereby progression of the film is allowed in forward and rearward directions.

3. In a magnetic sound-reading device for films in kinematographic projectors, said films having a sound track along one edge, in combination: a casing, magnetic reading heads in said casing, a lid on said casing over said heads, a stationary frame, a hollow cylindrical carrier recessed transversely to allow the film to pass through said carrier, means for securing adjustably said carrier to said frame ahead of said casing and said heads, said carrier being adapted to guide and position films to make the sound track on said film register exactly in alignment with said heads, a first auxiliary member in the recess of said carrier near one end thereof and rigidly secured to said carrier, a second auxiliary member in the said recess slidingly engaging the other end of said carrier, whereby the distance between said first and second auxiliary members along the axis of said carrier is adjustable to accommodate films of different widths, said first and second auxiliary members each having cooperating transverse surfaces facing each other and provided with V-shaped notches registering with each other to hold and guide the film solely by engagement of said V-notches with the thickness of the opposite longitudinal edges of the film, resilient means urging the first and second auxiliary members towards each other, guide means intermediate said carrier and said casing and heads having transverse surfaces facing each other and provided with V-shaped notches, adapted to guide the film by engagement solely of said V-shaped notches, with the thickness of the longitudinal edges of the film as it is about to engage the heads, unitary spring means secured to said lid and adapted to contact directly the film in a direction parallel to that of the travel of the film and urge it with an adjustable pressure over and flat against said heads, a freely revoluble shaft located beyond said heads, bearings at each end of said shaft, and means adapted to urge the film passing off the heads into engagement with an accurately defined section of said shaft and on a peripheral portion of said shaft facing towards the heads and between said bearings.

4. A device as claimed in claim 1, which comprises further: in said casing, a first plate secured in a vertically adjustable position to said casing, a second plate secured in a transversely adjustable position to said first plate and carrying said heads, whereby the location of said reading heads can be exactly defined with reference to the sound track of the film.

5. A device as claimed in claim 1, in which said second guide means comprise a first member rigid with the casing and provided with a V-shaped notch and a second member pivotally secured to the casing and provided with a second V-shaped notch facing said first mentioned notch when said second member is shifted into its operative position to cooperate with said first member in the feeding of the film towards the heads, yielding means urging said second member into its operative position, said V-shaped notches engaging only the thickness of the opposite longitudinal edges of the film.

6. In a magnetic sound-reading device for films in kinematographic projectors, said films having a sound track along one edge, in combination: a casing, magnetic reading heads adjustably carried in said casing, first guide means ahead of said casing and heads adapted to guide and position films to make the sound track on said films register exactly in alignment with said heads, said first guide means being adjustable in length in a direction transverse to that of the travel of the film whereby said first guide means is adapted to accommodate films of different widths, second guide means intermediate said first guide means and said heads and adapted to guide the film as it is about to engage the heads, said first and second guide means being provided each with cooperating surfaces having V-shaped notches guiding the film solely by engaging the thickness of the opposite longitudinal edges of the film, a film-pressing plate pivotally secured to said casing above said heads and adapted to move between an inoperative position uncovering said heads and an operative position covering the latter, spring blades carried by the underside of said pressing plate and adapted, when the pressing plate is in its operative position, to contact the film directly in a direction parallel to that of the travel of the film and to urge the film flat against said heads, means for adjusting the pressure exerted by said pressing plate and said spring blades against the film, holding means for yieldingly and transiently maintaining the pressing plate in its inoperative position, a freely revoluble shaft located beyond said heads, bearings at each end of said shaft, and means adapted to urge the film passing off said heads into engagement with an accurately defined section of said shaft on a peripheral portion of said shaft facing towards said heads, and between said bearings.

7. In a magnetic sound-reading device for films in kinematographic projectors, said films having a sound track along one edge, in combination: a casing, magnetic reading heads in said casing, a lid on said casing over said heads, first guide means ahead of said casing and heads adapted to guide and position films to make their sound track register exactly in alignment with said heads, said first guide means being adjustable in length in a direction transverse to that of the travel of the film whereby said first guide means is adapted to guide films of different widths, second guide means intermediate said first guide means and said heads and adapted to guide the film as it is about to engage the heads, said first and second guide means guiding the film solely by engagement with the thickness of the opposite longitudinal edges of the film by means of cooperating V-shaped notches in said guide means, spring blades attached to said lid and adapted to contact the film directly in a direction parallel to that of the travel of the film and to urge it with an adjustable pressure over and flat against said heads, a freely revoluble shaft located beyond said heads, bearings for each end of said shaft, a pressure roller adapted to urge the film passing off said heads into engagement with an accurately defined section of said shaft between said bearings on a peripheral portion of said shaft facing towards said heads, a stationary frame carrying one of said bearings, a carrier member carrying said other bearing and rigid with said frame and including a cylindrical section coaxial with said shaft, a recess in said cylindrical section through and across which the film is adapted to engage said shaft, a pivoted link system mechanically connecting said pressure roller with said frame, and springs urging the link system into a position at which said roller holds the film in contact with said shaft.

References Cited in the file of this patent

UNITED STATES PATENTS

| | | |
|---|---|---|
| 1,815,692 | Von Madaler | July 21, 1931 |
| 1,886,540 | Grant | Nov. 8, 1932 |

(Other references on following page)

UNITED STATES PATENTS

| | | |
|---|---|---|
| 1,947,290 | Fonda | Feb. 13, 1934 |
| 2,011,272 | Duggan | Aug. 13, 1935 |
| 2,048,487 | Begun | July 21, 1936 |
| 2,487,976 | Kuhlik | Nov. 15, 1949 |
| 2,490,771 | Begun | Dec. 13, 1949 |
| 2,530,584 | Pontius | Nov. 21, 1950 |
| 2,532,761 | De Blasio | Dec. 5, 1950 |
| 2,577,162 | Smith | Dec. 4, 1951 |
| 2,604,321 | Williams | July 22, 1952 |
| 2,682,410 | Bauman | June 29, 1954 |
| 2,694,107 | Camras | Nov. 9, 1954 |

FOREIGN PATENTS

| | | |
|---|---|---|
| 842,128 | Germany | June 23, 1952 |